Nov. 14, 1939.　　　　W. LENZ　　　　2,180,154
GEARED DRIVING ARRANGEMENT
Filed Nov. 20, 1937
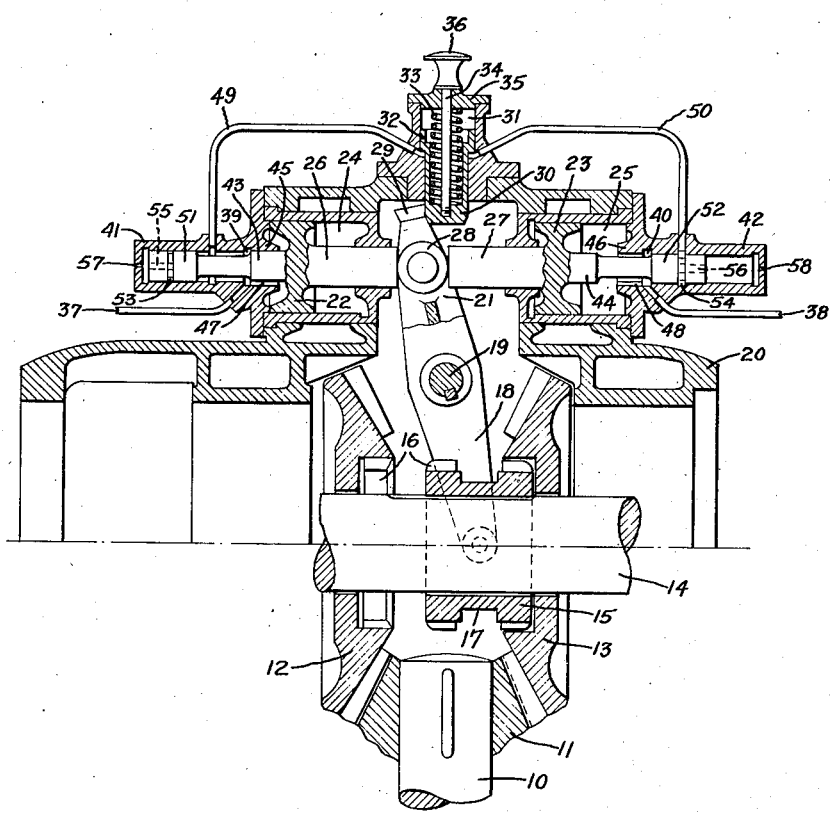
Inventor:
Walter Lenz,
by Harry E. Dunlow
His Attorney.

Patented Nov. 14, 1939

2,180,154

UNITED STATES PATENT OFFICE 2,180,154

GEARED DRIVING ARRANGEMENT

Walter Lenz, Berlin-Reinickendorf, Germany, assignor to General Electric Company, a corporation of New York Application November 20, 1937, Serial No. 175,710
In Germany November 20, 1936

6 Claims. (Cl. 192—87)

The present invention relates to geared driving arrangements, more particularly to power shifted mechanisms for effecting operative connection between a driving shaft and a driven shaft and means for securing the power shifting mechanism against unintentional movement once it has been operated.

In power driven apparatus it is desirable to provide the gear shifting or clutching mechanism with locking means to preclude the disengagement of the operative connection due to mechanical vibrations or jars to which the mechanism must be subjected while in operation. In the case of railway vehicles of the type in which power is transmitted directly to the driving axles through reversing gearing, such gearing is subjecting to heavy jars transmitted to it from the wheels as well as to vibrations from the vehicle itself. Unintentional disengagement of such gearing my result in disastrous consequences since positive control of the driving connections by the operator is essential at all times for the safe operation of the vehicle.

In one form of the invention described, the gear shift locking means is embodied in a power reversing drive of a well-known type where the reversing connection is accomplished by means of a two position clutch alternatively effecting an operative connection between a driven shaft, and either of two oppositely rotatable driving gears. The shifting of the clutch is accomplished by means of compressed fluid actuated pistons while the clutch shifting lever is secured in either of its operative positions by means of a spring biased plunger, the plunger being so arranged with respect to the shifting lever that any forces transmitted through the lever act transversely against the plunger and do not influence the biasing means toward a releasing position. The plunger is provided with a fluid actuated piston so interconnected with the clutch shifting actuators that when pressure is applied to one of the latter to change the driving connection, the locking plunger is first automatically actuated to a releasing position. After the shifting operation has been completed, the fluid pressure to the locking plunger is blocked off and vented to atmosphere permitting the biasing means to automatically restore the plunger to the locking position.

It is an object of this invention to provide an improved locking arrangement for gear shifting mechanisms which is simple in design and automatic in mode of operation.

For a consideration of what I believe to be novel in my invention, attention is directed to the following description and the claims appended thereto in connection with the accompanying drawing.

In the single figure of the drawing I have shown a sectional view of a reversing drive mechanism embodying my invention.

In the drawing, 10 indicates the drive shaft extending from the power source, not shown, on the end of which shaft the conical pinion gear 11 is secured. Two bevel-gears 12 and 13, mounted on a driven shaft 14 and freely rotatable thereon, are held in engagement with the pinion 11 and are rotated thereby in opposite directions. Between the two bevel-gears 12 and 13, a clutch member 15 is splined onto the shaft 14 in any suitable manner. This clutching member, while rotatably secured to the shaft 14, is so arranged that it is freely slidable longitudinally on the shaft to effect a driving connection, depending upon its position, between either of the bevel-gears 12 and 13 and the shaft 14. The engagement between the clutch member and the bevel-gears may be effected in any well-known manner such as by cooperating lugs 16 provided on the clutching member and in recessed portions of the bevel-gears. The clutching member 15 is provided with an annular groove 17 in the central portion thereof in which a shifting yoke 18 is adapted to engage. The yoke is adapted to pivot about a shaft 19 to which it is keyed, the shaft being freely rotatable in suitable bearings provided in the mechanism housing 20.

In order to effect the shifting operation of the driving connection from one position to the other, fluid actuating means are provided on opposite sides of an arm 21 extending from the upper end of the yoke 18. The fluid actuating means comprise pistons 22 and 23 slidably arranged in cylinders 24 and 25 respectively, the pistons being provided with push rods 26 and 27 which extend toward each other to engage with the interpositioned roller 28 provided on the arm 21. The upper end of the arm 21 is provided with a projection 29 adapted to be engaged by the lower end 30 of the lock plunger. The lock actuating mechanism comprises a cylinder 31 having a piston therein formed by an enlarged section 32 on the upper end of the plunger 30 and a spring 33 provided within a bore in the plunger biasing the plunger to the extended or locking position. For the manual withdrawal of the plunger from the locking position, a pin 34 threaded into the lower portion thereof extends through the cap 35 having a suitable handle or knob 36 secured thereto.

The fluid pressure is supplied to the actuators through intake connections 37 and 38 which communicate with the two annular chambers 39 and 40 in the cylindrical extensions 41 and 42 of the cylinders 24 and 25. Fluid pressure blocking shoulders 43 and 44 extending from the pistons 22 and 23 and slidable in the guides 45 and 46 limit the flow of pressure fluid into the cylinders 24 and 25, narrow slots 47 and 48 being provided in the guides to allow only a small leakage of pressure fluid into the cylinders until the shoulders clear the guides. Conduits 49 and 50 extend from the cylindrical extensions to conduct fluid pressure therefrom into the cylinder 31 of the locking mechanism beneath the piston 32 provided therein. The valves 51 and 52 formed on extensions from the pistons 22 and 23, respectively, are arranged to cut off the flow of fluid pressure through the conduits 49 and 50 when either piston has been actuated to an extended position. Annular grooves 53 and 54 communicating with bores 55 and 56 in the extremities of the valves 51 and 52 together with small exhaust openings 57 and 58 in the end walls of the cylindrical extensions provide a passage to allow the fluid pressure from the cylinder of the locking mechanism to vent to atmosphere.

The operation of the illustrated arrangement will now be described. In the indicated position the driving shaft 10 is connected with the driven shaft 14 through the pinion 11 engaging with the bevel-gear 13 which is connected to the driven shaft 14 through the clutch member 15. This driving connection is secured by the lock plunger 30 which is in engagement with the projection 29 of the clutch shifting lever 21. As shown in the drawing the projection 29 of the shifting lever bears against the plunger 30 in a lateral direction with the result that any force transmitted through the lever 21 from the drive mechanism or from the fluid operated piston 26 will not countereffect the force of the biasing spring 33 in maintaining the plunger in a locking position. Consequently there is no danger of the plunger 30 being moved out of locking position against the action of the spring 33. Since the pressure side of the piston 32 of the locking means is continually vented to atmosphere through conduit 50 and passages 54, 56 and 58 there is no possibility of fluid pressure passing from the cylinder 25 past the control valve 52 into the cylinder 31 thereby moving the plunger from the locking position even though fluid pressure is continuously connected at 38.

If the direction of rotation of the driven shaft 14 is to be reversed, fluid pressure is admitted into the inlet 37. The fluid pressure flowing through the chamber 39 passes through the conduit 49 into the cylinder 31 beneath the piston 32, moving the plunger 30 to its uppermost position. Because of the relatively small opening 58 in the end wall of the cylindrical extension 42, the fluid passing through the conduit 50 will not be sufficient to prevent the upward movement of the plunger 30. Simultaneously a small quantity of pressure fluid will flow into the cylinder 24 through the slot 27, but since this quantity of pressure fluid can only be comparatively small because of the small size of slot 47, the pressure fluid will advance more rapidly through the conduit 49 to the pressure side of the piston 32 and will raise the plunger. With the plunger in the elevated position, fluid pressure in the cylinder 24 will gradually build up moving the piston 22 slowly to the right until the shoulder 43 clears the guide 45 when the fluid pressure acting upon the enlarged area of the piston will rapidly force it to its outermost position. Consequently the shifting lever 21 is moved in a clockwise direction, shifting the clutch member into engagement with the bevel-gear 12 for driving the shaft 14 in the opposite direction. Upon the completion of the switching operation, the projection 29 of the lever 21 will lie to the right of the plunger 30 which will again assume its locking position under the influence of the biasing spring 33 securing the lever 21 in its new position. It will be noted that as the piston moved to the right, valve 51 cut off the fluid pressure from conduit 49, and as the annular groove 53 moved opposite the opening to this conduit, the fluid under pressure therein vented to atmosphere through the passage 55 and the opening 57.

Obviously it is also possible to adjust the driving connection to a neutral position in addition to the two described operative connections of the clutch 15. To accomplish this the locking plunger 30 may be lifted manually by means of the handle 36 allowing manual movement of the clutch shifting lever 21 by any suitable means attached to an end of the shaft 19 to which the clutch shifting yoke is keyed.

Having described the method of operation of my invention together with the apparatus which I now consider to represent the best embodiment thereof, I desire to have it understood that the specific arrangement as shown is only illustrative and that the invention may be carried out by other means.

What I claim as new and desire to secure by Letters Patent of the United States, is:

1. A clutch shifting arrangement comprising a lever, actuating means for said lever including a pair of pistons opposingly arranged on opposite sides of said lever, spring biased means for locking said lever in either of its operative positions, fluid pressure actuating means associated with said locking means, connections including valves controlled by said pistons between said last mentioned fluid pressure actuating means and said lever actuating means whereby said locking means will be moved to the releasing position upon energization of one of said pistons.

2. A clutch shifting arrangement comprising a lever, a pair of opposed fluid pressure actuating means for said lever arranged on opposite sides thereof, means for normally locking said lever in either of its operative positions, fluid pressure actuating means associated with said locking means, connections including valves operable by said fluid pressure actuating means for said lever whereby said locking means is first moved to the inoperative position upon energization of one of said lever actuating means, and restored to locking position upon the actuation of said lever.

3. An arrangement for shifting a clutch member between two operative positions comprising a lever, fluid pressure actuating means for said lever, locking means for normally restraining said lever against movement, fluid pressure actuated means for moving said locking means to releasing position upon admission of fluid to said lever actuating means, and valve means adjustable by said lever actuating means for relieving the fluid pressure from said locking means upon the actuation of said lever.

4. An arrangement for shifting a clutch member comprising a lever, a pair of opposed fluid pressure actuating means for said lever arranged on opposite sides thereof, locking means for normally restraining said lever in either of its operative positions, fluid pressure actuated releasing means for moving said locking means to the inoperative position, conduit means for supplying operating fluid to said lock releasing means upon admission of operating fluid to either of said lever actuating means, and valve means associated with said conduit means adjustable by said lever actuating means for releasing operating fluid from said locking means upon the actuation of said lever.

5. An arrangement for shifting a member to either of two predetermined positions comprising a pair of actuating means for said member arranged on opposite sides thereof, means for locking said member in either of its two predetermined positions, releasing means for said locking means, and control means connected to each of said pair of actuating means and actuable thereby whereby said releasing means is energized upon the energization of either of said member actuating means.

6. An arrangement for shifting a member selectively to either of two predetermined positions comprising a pair of opposingly arranged fluid pressure actuating means for said member, means for normally locking said member in either of its two predetermined positions, fluid pressure responsive releasing means for said locking means, and valve means operatively connected to each of said pair of fluid pressure actuating means for controlling the fluid flow to said releasing means whereby said releasing means is energized upon the energization of either of said pair of actuating means and is deenergized upon the actuation of the member to the actuated position.

WALTER LENZ.